(12) United States Patent
Firoiu et al.

(10) Patent No.: US 8,265,091 B2
(45) Date of Patent: Sep. 11, 2012

(54) TRAFFIC MULTIPLEXING USING TIMESTAMPING

(75) Inventors: Victor Firoiu, Westford, MA (US); Eric Haversat, Tewksbury, MA (US); Xiaohui Zhang, Billerica, MA (US); Richard Lacerte, Windham, NH (US); Carl Keene, Andover, MA (US)

(73) Assignee: Avaya Inc., Basking Ridge, NJ (US)

( * ) Notice: Subject to any disclaimer, the term of this patent is extended or adjusted under 35 U.S.C. 154(b) by 1150 days.

(21) Appl. No.: 10/920,913

(22) Filed: Aug. 18, 2004

(65) Prior Publication Data

US 2006/0039393 A1    Feb. 23, 2006

(51) Int. Cl.
*H04L 12/28* (2006.01)

(52) U.S. Cl. ............... 370/412; 370/232; 370/235

(58) Field of Classification Search ............ 370/369, 370/388, 395.4, 412, 413, 232, 235
See application file for complete search history.

(56) References Cited

U.S. PATENT DOCUMENTS

| | | | | |
|---|---|---|---|---|
| 4,769,810 A | * | 9/1988 | Eckberg et al. | 370/232 |
| 5,559,796 A | * | 9/1996 | Edem et al. | 370/412 |
| 6,072,772 A | * | 6/2000 | Charny et al. | 370/229 |
| 6,118,792 A | * | 9/2000 | Beshai | 370/468 |
| 6,269,079 B1 | * | 7/2001 | Marin et al. | 370/230 |
| 6,724,776 B1 | * | 4/2004 | Jeffries | 370/468 |
| 6,735,212 B1 | * | 5/2004 | Calamvokis | 370/412 |
| 6,769,033 B1 | * | 7/2004 | Bass et al. | 709/246 |
| 6,771,652 B1 | * | 8/2004 | Aydemir et al. | 370/412 |
| 6,856,622 B1 | * | 2/2005 | Calamvokis et al. | 370/390 |
| 6,956,851 B1 | * | 10/2005 | McKeown et al. | 370/369 |
| 7,047,310 B2 | * | 5/2006 | Bedekar et al. | 709/232 |
| 7,120,160 B2 | * | 10/2006 | Takase et al. | 370/415 |
| 7,203,171 B1 | * | 4/2007 | Wright | 370/236.1 |
| 7,283,470 B1 | * | 10/2007 | Sindhu et al. | 370/230 |
| 7,286,552 B1 | * | 10/2007 | Gupta et al. | 370/413 |
| 7,296,083 B2 | * | 11/2007 | Barham et al. | 709/232 |
| 7,599,292 B1 | * | 10/2009 | Gupta et al. | 370/235 |

OTHER PUBLICATIONS

Firoiu et al., "Feedback Output Queuing: A Novel Architecture for Efficient Switching Systems", Aug. 21, 2002, IEEE Symposium on High Performance Interconnects 2002, p. 15-20.*
Firoiu et al, "A Study of Active Queue Management for Congestion Control", IEEE Infocom 2000, p. 1435-1444.*

* cited by examiner

*Primary Examiner* — Robert Wilson
*Assistant Examiner* — Brian O Connor
(74) *Attorney, Agent, or Firm* — Anderson Gorecki & Manaras LLP

(57) ABSTRACT

Multiplexed traffic in a system where the maximum rate of all inputs exceeds the maximum rate of the output is processed via a separate queue for each input, and at any given forwarding clock cycle the earliest enqueued packet is forwarded via the output. In the event of congestion, a proportionally equal number of packets are dropped from each queue, where proportional equality corresponds to the number of packets dropped per number of packets enqueued. One implementation associates a time-stamp with each enqueued packet to indicate the time of enqueing relative to other enqueued packets. At any given forwarding clock cycle, the packet with the earliest time-stamp is forwarded.

12 Claims, 3 Drawing Sheets

TRAFFIC MULTIPLEXING USING TIMESTAMPING

FIELD OF THE INVENTION

This invention is generally related to network communications, and more particularly to queue management.

BACKGROUND OF THE INVENTION

A network node, such as a switch or router, functions to move traffic between different inputs and outputs in order to advance individual units of traffic, such as packets, from source towards destination. Nodes typically includes a plurality of inputs and outputs which are interconnected by a fabric. Inputs may be combined, such as by multiplexing, on line cards in a node to reduce the corresponding complexity and cost of the fabric and other parts of the node.

Techniques for providing "fair" forwarding of multiplexed inputs are known. Traffic in a packet-based data network tends to fluctuate over relatively short intervals of time. In order to handle short-term traffic fluctuation it is known to employ input buffering on the line cards. Input buffers are typically organized into queues associated with different inputs, which are multiplexed. Fairness is implemented by managing forwarding of packets from the queues. For example, round-robin scheduling provides equal forwarding fairness to each queue of a group of managed queues by forwarding one packet from each queue in succession. However, round-robin scheduling may result in disproportionate dropping of packets of particular inputs. For example, if in a given time interval one queue in the managed group is full and the other queues are nearly empty then all or nearly all of the packet drop (assuming there is packet drop) may be suffered by the full queue during that time interval. A technique referred to as Weighted Fair Queuing ("WFQ") provides means for compensating for the disproportionate packet drop of the basic round-robin technique. In WFQ, a priority differentiator, i.e., weight, is assigned to each individual queue. The frequency of forwarding packets from each queue is proportional to the weight of the queue. In practice this may be accomplished by employing different clock rates with different queues. The weights for the different queues may be selected in accordance with anticipated traffic patterns in order to achieve desired form of fairness. However, network traffic rates may be unknown in advance, and may also tend to fluctuate over relatively long intervals of time, thereby causing the predetermined weighting to be less fair.

SUMMARY OF THE INVENTION

In accordance with the present invention, a queue management fairness procedure drops proportionally equal numbers of data units for each queue of a managed group of queues when congestion occurs, i.e., for each queue that is non-empty during an interval of time, the number of packets dropped divided by the number of packets enqueued is approximately equal for each of those non-empty queues during the time interval. The fairness procedure may include associating a time-stamp with each packet queued in a managed group of queues. The time-stamp is an indicator of the time at which the packet was enqueued relative to other enqueued packets. At any given forwarding clock cycle, the packet with the earliest time-stamp, i.e., the first arrived packet, at the heads of the queues is forwarded.

One advantage of the invention is that the fairness policy automatically adjusts to fluctuations in traffic patterns. Time-stamps are a form of packet weighting. However, unlike the predetermined queue weighting of WFQ, time-stamps provide a relative weight that changes with transmission rate because the weight of each time-stamp is dependent on the transmission rates of all of the inputs.

Another advantage of the invention is cost savings in implementation. Those skilled in the art will recognize that a single FIFO queue could be employed rather than a group of queues to achieve the intended result of proportional forwarding. The single FIFO queue would queue packets in the order in which they were received and forward the earliest queued packet in a given clock cycle. However, the memory device for implementing such a single FIFO queue would be required to write at a rate at least as great as the sum of the rates of the inputs in order to avoid dropping packets arriving contemporaneously from different inputs. Generally, memory devices capable of functioning at higher read/write rates are more costly than devices which function at lower rates. The present invention enables utilization of less costly memory devices to achieve the same desired result. In particular, because multiple queues are employed the invention enables use of memory devices having a write speed equal to the maximum rate of ingress ports and a read speed equal to the maximum rate of the egress interface. Consequently, cost savings can be realized by utilizing lower read/write rate memory devices.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
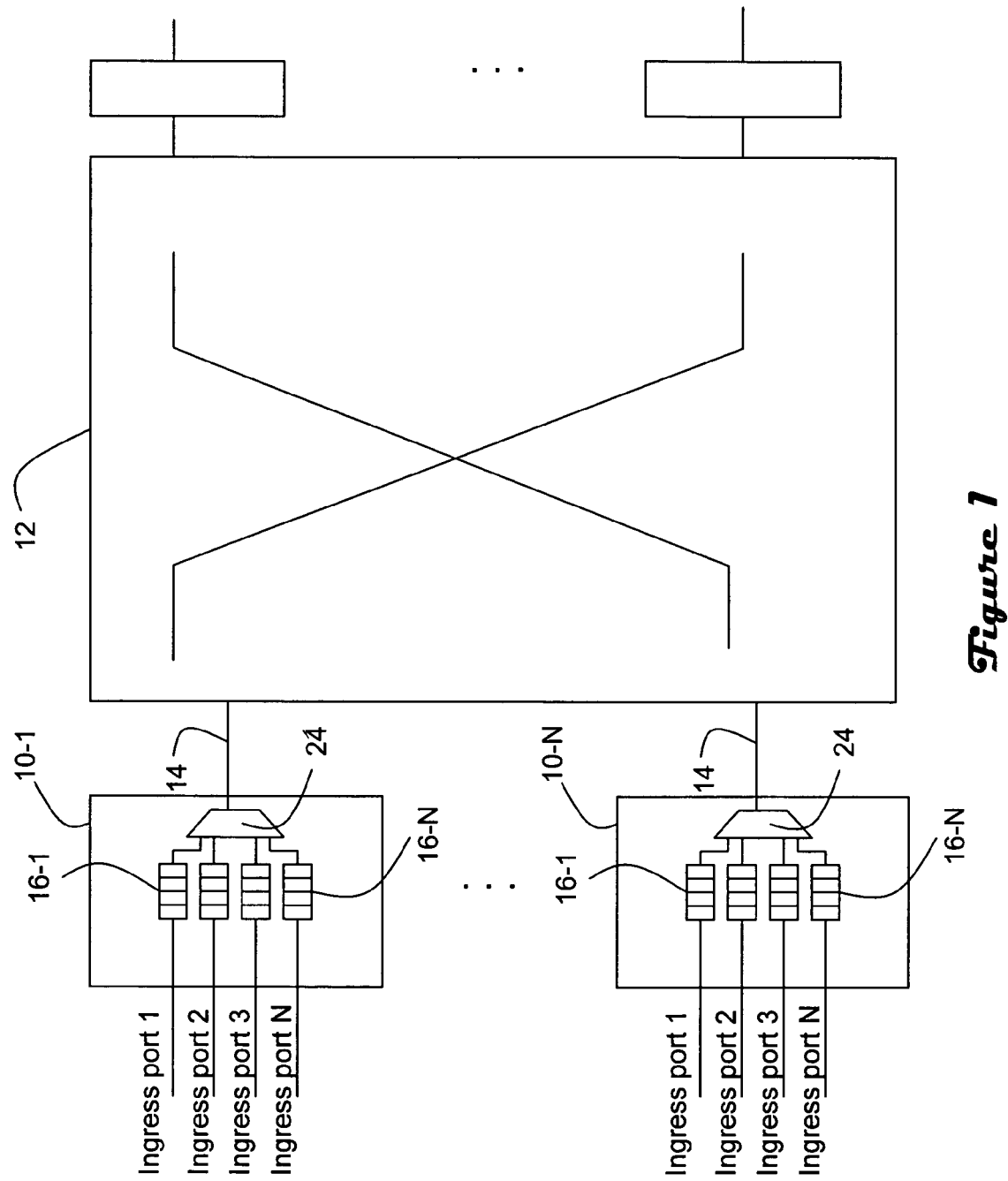
FIG. 1 is a block diagram of a network node in which time-stamp scheduling is employed.
Figure 2:
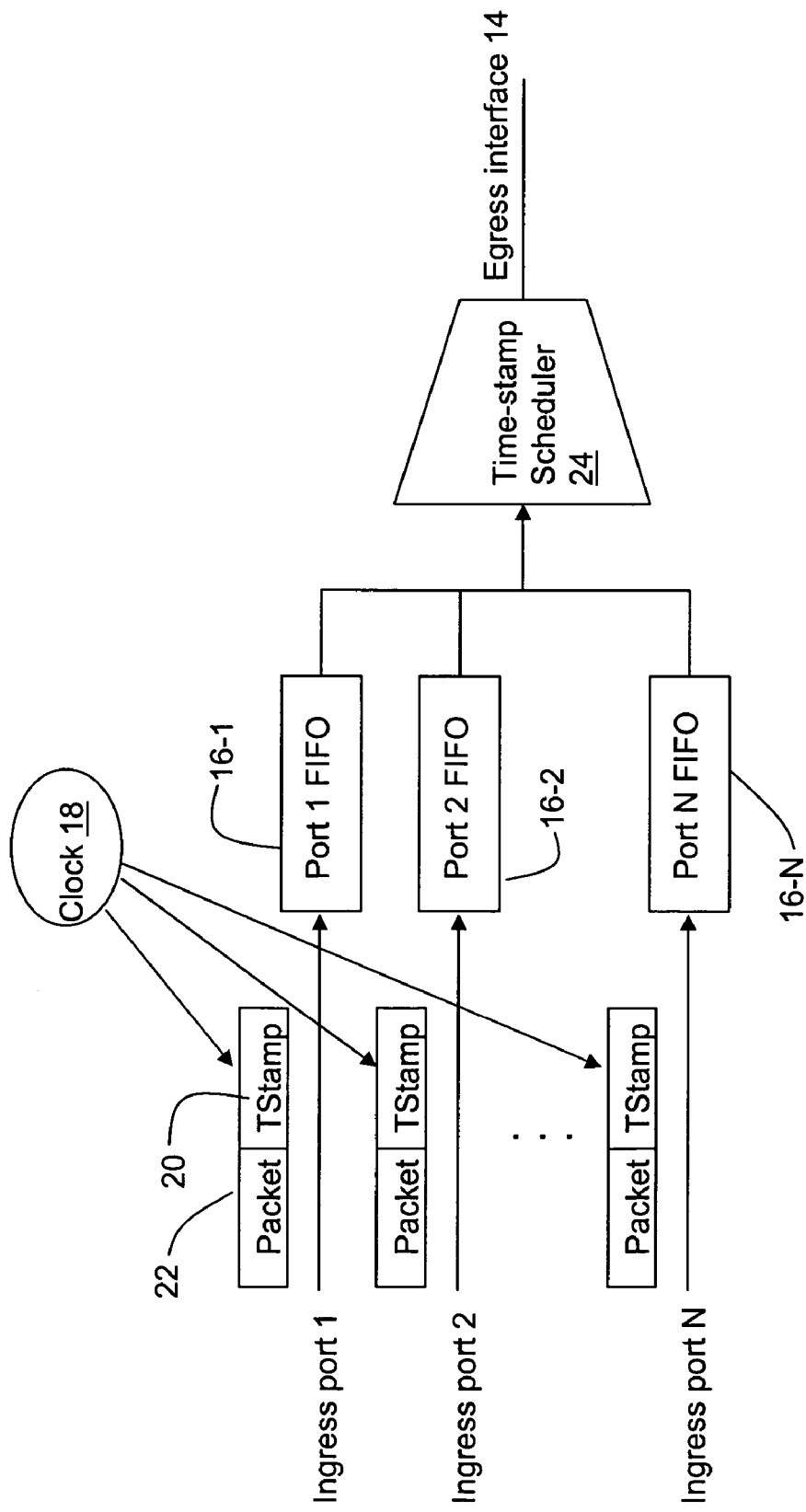
FIG. 2 illustrates the queues and forwarding path of the line card of FIG. 1 in greater detail.

Referring to FIGS. 1 and 2, time-stamp scheduled queuing is implemented in a line card associated with a switch/router. The switch/router includes a plurality of line cards 10-1 through 10-N which are interconnected via a fabric or cross-connect 12. Each line card includes a plurality of ingress ports 1-N which receive traffic from other network nodes. The line cards are operative to, among other things, multiplex incoming traffic such as packets received on the associated ingress ports for subsequent transmission on an egress interface 14 to the fabric. It should be noted that for each line card 10 the sum of the maximum transmission rates over all ingress ports 1-N is greater than the maximum rate of the egress interface 14. Hence, congestion can potentially occur at the egress interface.

The line cards each include a separate queue 16 for each ingress port. In particular, queues 16-1 through 16-N are coupled with ingress ports 1-N on a 1:1 basis. The queues are implemented on one or more memory devices. In each queue, packets are moved from the input end to the head in the order in which they are received, i.e. First In First Out ("FIFO"). Hence, the packets in a queue at any given time are arranged in chronological order with the earliest enqued packet at the head of the queue.

A clock circuit 18 is provided to assign time-stamps 20 to packets 22 as the packets are enqueued. In particular, the time stamp is appended to the packet and stored in the queue with the associated packet as the packet is enqueued. The clock may employ various means of time-stamping, but a simple counter may suffice. The counter has a value at any given time which is incremented (or decremented, depending on the convention used) at each forwarding clock cycle, eventually rolling over and restarting. The size of the counter, i.e., the maximum count, is selected such that earlier and later arriving packets will not be assigned the same time-stamp due to counter rollover.

A time-stamp scheduler 24 is employed to multiplex the enqueued packets based on their associated time-stamps. In particular, the time stamp scheduler is operative to select the earliest enqueued packet at the heads of the queues 16-1 through 16-N. The earliest enqueued packet may be selected for each forwarding clock cycle by comparing the time-stamps associated with the packets at the heads of the queues to determine which of those packets has the lowest time-stamp counter number, i.e., the earliest time-stamp (or the highest counter number depending on the convention used). The selected packet is then forwarded via the egress interface.

The result of the above described technique is that for each non-empty queue during a given time interval I, the number of packets dropped during the time interval $PD_n(I)$ divided by the number of packets enqueued during the time interval $PE_n(I)$ is at least approximately proportionally equal for each of those non-empty queues, i.e., $PD_n(I)/PE_n(I) \approx PPD_n(I)$ for each non-empty queue. This is true for non-empty queues because packets are not dropped for empty queues. Further, while $PPD_n(I)$ may be equal for each non-empty queue, $PPD_n(I)$ may differ slightly between non-empty queues depending on the duration, start point and stop point of the interval measured relative to queue activity as will be described below.

Figure 3:
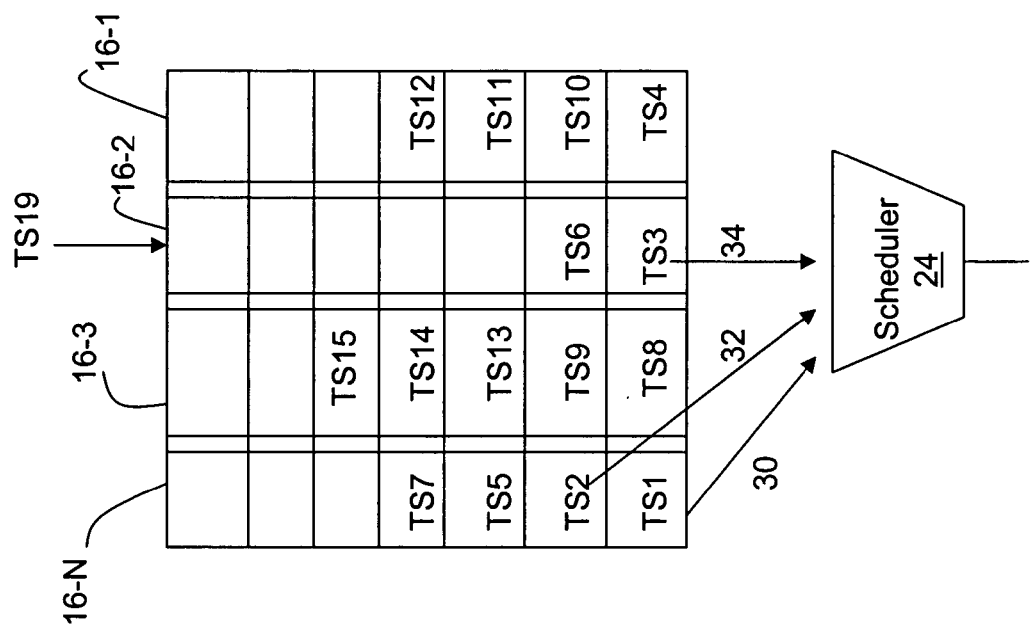
FIG. 3 illustrates processing of packets in accordance with the architecture illustrated in FIGS. 1 and 2.

FIG. 3 illustrates processing of packets in accordance with the architecture illustrated in FIGS. 1 and 2. The queues 16-1 through 16-N are shown in a simplified form and in practice the number and depth of the queues may differ significantly from the illustrated example. Further, although time-stamps TS1-TS19 are shown in decimal it may be more practical to implement the time-stamps in binary. At a time t=0, queue 16-N has four queued packets, queue 16-3 has five queued packets, queue 16-2 has two queued packets, and queue 16-1 has four queued packets. Each queued packet has been associated with a time-stamp TSx indicating the time at which the packet was enqueued relative to the other enqueued packets. In particular, a lower numbered time-stamp, e.g., TS1, indicates an earlier enqueued packet than a higher numbered time-stamp, e.g., TS15. In or before a first forwarding clock cycle the time-stamps of the packets at the heads of the queues are compared to select the earliest enqueued packet. As between the packets at the heads of the queues which have the time-stamps "TS1," "TS8," "TS3," and "TS4," the packet having the time-stamp of "TS1" has the lowest number and hence is the earliest enqueued packet. Consequently, the packet at the head of queue 16-N having the timestamp "TS1" is selected and forwarded 30. The remaining packets in queue 16-N are then advanced such that the packet having the time-stamp "TS2" is at the head of queue 16-N.

In or before a second forwarding clock cycle the time-stamps of the packets at the heads of the queues are again compared. The packet at the head of queue 16-N having the time-stamp "TS2" is selected and forwarded 32. The remaining packets in queue 16-N are then advanced. In or before a third forwarding clock cycle the time-stamps of the packets at the heads of the queues are again compared. Now, the packet at the head of queue 16-2 having the time-stamp "TS3" is selected and forwarded 34. A newly enqueued packet in queue 16-2 is assigned the timestamp "TS19," indicating the count of the counter when the packet is enqueued. It will be noted that the time-stamps may not necessarily be contiguous in number. Operation in subsequent forwarding clock cycles proceeds in similar a manner.

In view of the illustrated example, it will be recognized by those skilled in the art that the described invention will proportionally equally drop packets of each queue if congestion occurs. In particular, the invention will drop a nearly equal percentage of packets from each queue in a given period from when congestion occurs to when congestion ends. Because it is not practical to drop only a portion of a packet or precisely control the duration of congestion, the term "proportionally equal" as used in this application implies equality within a range of tolerance that is mathematically and practically inherent in the inventive concept. Further, it will be recognized that the existence of theoretically extreme cases, such as where one queue is empty for the duration of congestion and hence has zero packets dropped while packets from other queues are dropped, are encompassed within the range of mathematical and practical tolerance inherent in the concept.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. An apparatus for multiplexing data units from a plurality of inputs onto an output having a transmission capacity less than the sum of the inputs, the apparatus comprising:
   a plurality of queues configured to enqueue the data units from the inputs; and
   a scheduler configured during any interval of time to prompt data unit drop for each queue in the plurality of queues that is non-empty in a manner that results in the ratio of the number of data units dropped in each non-empty queue in the plurality of queues divided by the number of data units enqueued in each non-empty queue in the plurality of queues is at least approximately equal for the interval of time.

2. The apparatus of claim 1 further including a clock operative to associate a time-stamp with each enqueued data unit indicating when the data unit was enqueued relative to other enqueued data units.

3. The apparatus of claim 2 wherein the clock comprises a counter.

4. The apparatus of claim 1 wherein the queues are FIFO queues, each having a head containing the respective earliest enqueued data unit for that queue, and wherein the scheduler is operative to compare the time-stamps of the data units at the heads of the queues to select and forward to the output the earliest enqueued data unit based on the time-stamps associated with those data units.

5. The apparatus of claim 1 wherein each queue is exclusively associated with a single respective one of the inputs.

6. A method for multiplexing data units from a plurality of inputs onto an output having a transmission capacity less than the sum of the inputs, the method comprising the steps of:
   enqueueing data units from the inputs; and during any interval of time, prompting data unit drop for each queue in the plurality of queues that is non-empty in a manner that results in the ratio of number of data units dropped in each non-empty queue in the plurality of queues divided by the number of data units enqueued in each non-empty queue in the plurality of queues is at least approximately equal for the interval of time.

7. The method of claim 6 further including the step of associating a time-stamp with each enqueued data unit indicating when the data unit was enqueued relative to other enqueued data units.

8. The method of claim 7 including the further step of a counter for associating a time-stamp with each enqueued data unit.

9. The method of claim 6 wherein the queues are FIFO queues, each having a head containing the respective earliest enqueued data unit for that queue, and including the further steps of comparing the time-stamps of the data units at the heads of the queues, and selecting and forwarding to the output the earliest enqueued data unit based on the time-stamps associated with those data units.

10. The method of claim 6 wherein each queue is exclusively associated with a single respective one of the inputs.

11. An apparatus for multiplexing data units from a plurality of inputs onto an output having a transmission capacity less than the sum of the inputs, the apparatus comprising:

a separate queue associated with each input, the queues operative to enqueue the data units from the associated inputs;

a clock circuit configured to associate a time-stamp with each enqueued data unit indicating time of receipt relative to other enqueued data units; and a scheduler configured to select and forward for a given forwarding clock cycle the data unit having the earliest time-stamp, whereby a proportionally equal number of packets are dropped from each non-empty queue during a period of congestion.

12. A method for multiplexing data units from a plurality of inputs onto an output having a transmission capacity less than the sum of the inputs, the method comprising the steps of:

enqueueing a received data unit in one of a plurality of separate queues, each associated with a separate input;

associating a time-stamp with the enqueued data unit indicating time of receipt relative to other enqueued data units; and selecting and forwarding for a given forwarding clock cycle the data unit having the earliest time-stamp, whereby a proportionally equal number of packets are dropped from each non-empty queue in the plurality of queues during a period of congestion.

* * * * *